United States Patent
Hayashi et al.

(12)

(10) Patent No.: US 6,982,297 B2
(45) Date of Patent: Jan. 3, 2006

(54) POLYVINYL ALCOHOL FILM AND POLARIZING FILM

(75) Inventors: Tetsushi Hayashi, Kurashiki (JP); Takanori Isozaki, Kurashiki (JP); Naoki Fujiwara, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 61 days.

(21) Appl. No.: 10/317,123

(22) Filed: Dec. 12, 2002

(65) Prior Publication Data

US 2003/0114566 A1    Jun. 19, 2003

(30) Foreign Application Priority Data

Dec. 17, 2001    (JP)    .............................. 2001-382960

(51) Int. Cl.
*C08K 5/05*    (2006.01)

(52) U.S. Cl. ...................... 524/386; 524/388; 524/555; 524/557; 525/59; 525/60; 525/61

(58) Field of Classification Search ................ 524/386, 524/388, 555, 557; 525/59, 60, 61
See application file for complete search history.

(56) References Cited

U.S. PATENT DOCUMENTS

| | | | | |
|---|---|---|---|---|
| 4,308,189 A | * | 12/1981 | Moritani et al. ............ 524/459 |
| 4,311,805 A | * | 1/1982 | Moritani et al. ............... 525/60 |
| 4,524,042 A | * | 6/1985 | Genba et al. ................ 264/211 |
| 4,563,394 A | * | 1/1986 | Ishikawa ..................... 428/422 |
| 4,645,794 A | * | 2/1987 | Davis et al. .................. 525/61 |
| 5,728,467 A | * | 3/1998 | Watanabe et al. ........ 428/411.1 |
| 6,166,117 A | | 12/2000 | Miyazaki |
| 6,337,369 B1 | | 1/2002 | Isozaki |
| 6,773,771 B1 | * | 8/2004 | Ashida et al. ........... 428/32.34 |

FOREIGN PATENT DOCUMENTS

| | | | |
|---|---|---|---|
| JP | 59-111639 | * | 6/1984 |
| JP | 60-230606 | | 11/1985 |
| JP | 63-108320 | | 5/1988 |
| JP | 05-100115 | | 4/1993 |
| JP | 08-188624 | | 7/1996 |
| JP | 9-207425 | | 8/1997 |
| JP | 11-005246 | | 1/1999 |
| JP | 11-119022 | | 4/1999 |
| JP | 2001-200070 | | 7/2001 |

* cited by examiner

*Primary Examiner*—Bernard Lipman
(74) *Attorney, Agent, or Firm*—Oblon, Spivak, McClelland, Maier & Neustadt, P.C.

(57) ABSTRACT

The invention is a film of a vinyl alcohol polymer that contains from 0.01 to 20 mol % of cationic group-containing units and contains from 0.5 to 24 mol % of α-olefin units having at most 4 carbon atoms. The polyvinyl alcohol film gives polarizing films and polarizer which are resistant to water and have good polarizing properties and which are free from a problem of irregular coloration.

13 Claims, No Drawings

POLYVINYL ALCOHOL FILM AND POLARIZING FILM

BACKGROUND OF THE INVENTION

1. Field of the Invention

The present invention relates to a polyvinyl alcohol film, and to a polarizing film and a polarizer that comprise the polyvinyl alcohol film.

2. Description of the Prior Art

A polarizer having the function of transmitting and blocking out light is a basic constitutive element in liquid crystal displays (LCD), along with the liquid crystal that functions as a switch for light therein. Regarding their application field, LCD were almost for small-sized instruments such as electronic calculators and wristwatches in the early days at the beginning of their development, but in these days, they have become much used in other various instruments such as notebook-sized personal computers, word processors, liquid-crystal color projectors, navigation systems for automobiles, and liquid-crystal TV. Given that situation, polarizer for these is required to be improved more so as to be free from a problem of irregular coloration than conventional ones.

In general, polarizer is fabricated by preparing a polarizing film substrate of a stretched and oriented polyvinyl alcohol film (this will be hereinafter referred to as "PVA film", and its raw material, polyvinyl alcohol is a polyvinyl alcohol polymer and this will be hereinafter referred to as "PVA") or of a polyene film (this is prepared by dehydrochlorinating a polyvinyl chloride film or by dehydrating a PVA film to thereby make it have a polyene structure therein), followed by applying thereto a polarizing element of iodine or dichroic dye.

Of such polarizing films that are obtained by stretching and orienting a PVA film, those having a polarizing element of iodine therein have good initial polarizing properties, but they are poorly resistant to heat and water and are therefore problematic in that their polarizing properties are worsened when they are used in a high-temperature and high-humidity environment. For improving the durability of such iodine-containing polarizing films, some methods have heretofore been taken into consideration. For example, PVA for these is modified or crosslinked, or PVA films are subjected to heat treatment, or the polarizing films themselves are protected with a polymer film of low moisture permeability. However, any of these methods could not still produce satisfactory results.

On the other hand, polarizing films having a polarizing element of dichroic dye therein are more resistant to heat and water than those with iodine therein, but are problematic in that their initial polarizing properties are not so good. This is because the molecular weight of dichroic dye is larger than that of iodine and, as a result, PVA films could not well adsorb such dichroic dye and are often unevenly dyed with it. A method was tried of introducing a cationic group into PVA, a raw material for PVA films, in expectation of improving the dichroic dye adsorbability of the resulting polarizing films (Japanese Patent Laid-Open No. 230606/1985). However, the polarizing films of the type that contain dichroic dye in the surface or inside the PVA film of such a cationic group-containing modified PVA are still problematic in that their water resistance is poor.

For fabricating polarizing films of good water resistance, a technique was proposed of using a film of an ethylene-vinyl alcohol copolymer having an ethylene content of from 1 to 24 mol % for the substrate of polarizing films (Japanese Patent Laid-Open Nos. 100115/1993 and 188624/1996). However, the polarizing films of the type of which the substrate is of a film of a polyvinyl alcohol polymer with an ethylene group introduced thereinto are also still problematic in that their polarizing properties are not good when they are dyed with dichroic dye, as so demonstrated in Comparative Example 6 given hereinunder.

The present invention is to provide a polyvinyl alcohol film that is useful for a raw material for polarizing films of which the advantages are that not only they have good water resistance and good polarizing properties but also they are free from the problem of irregular coloration, and to provide a polarizing film and a polarizer that comprise the polyvinyl alcohol film.

SUMMARY OF THE INVENTION

Given that situation, we the present inventors have assiduously studied and, as a result, have found that a film of a vinyl alcohol polymer which contains a specific amount of cationic group-containing units and contains a specific amount of α-olefin units having at most 4 carbon atoms is effective for solving the problems noted above, and have completed the present invention.

Specifically, the invention is a polyvinyl alcohol film of a vinyl alcohol polymer that contains from 0.01 to 20 mol % of cationic group-containing units and contains from 0.5 to 24 mol % of α-olefin units having at most 4 carbon atoms.

The polyvinyl alcohol film of the invention gives a polarizing film of which the advantages are that not only it has good water resistance and good polarizing properties but also it is free from the problem of irregular coloration, and the polarizing film gives a polarizer also having the advantages as above.

DETAILED DESCRIPTION OF EMBODIMENTS OF THE INVENTION

The invention is described in detail hereinunder.

PVA for use herein for fabricating the PVA film of the invention is obtained by hydrolyzing a copolymer of a vinyl ester, a cationic group-containing monomer and an α-olefin having at most 4 carbon atoms. The vinyl ester includes, for example, vinyl formate, vinyl acetate, vinyl propionate and vinyl pivalate, but is generally vinyl acetate.

The cationic group-containing units to be introduced into PVA in the invention are meant to indicate chemical structure units that dissociate to have a positive charge in an aqueous solution thereof. Specific examples of the cationic group-containing monomer to give such chemical structure units are trimethyl-(3-acrylamido-3-dimethylpropyl)ammonium chloride, 3-acrylamidopropyltrimethylammonium chloride, 3-methacrylamidopropyltrimethylammonium chloride, quaternary ammonium salts of N-(3-allyloxy-2-hydroxypropyl)dimethylamine, quaternary ammonium salts of N-(4-allyloxy-3-hydroxybutyl)diethylamine, as well as quaternary ammonium salts of acrylamide, N-methylacrylamide, N-ethylacrylamide, N,N-dimethylacrylamide, diacetonacrylamide, N-methylolacrylamide, methacrylamide, N-methylmethacrylamide, N-ethylmethacrylamide and N-methylolmethacrylamide.

The content of the cationic group-containing units in PVA falls between 0.01 and 20 mol %, but preferably between 0.05 and 10 mol %, more preferably between 0.1 and 5 mol %. PVA in which the content of the cationic group-containing units is smaller than 0.01 mol % could not have the effect of the cationic group introduction thereinto. In view of the dichroic dye adsorbability of the polarizing film of PVA, the content of the cationic group-containing units in PVA is more desirably at least 0.05 mol %, even more desirably at least 0.1 mol %. On the other hand, PVA in which the content of the cationic group-containing units is larger than 20 mol % and which contains such chemical structure units are difficult to produce. In view of the water resistance of the polarizing film of PVA, the content of the cationic group-containing units in PVA is more desirably at most 10 mol %, even more desirable at most 5 mol %.

α-olefins having at most 4 carbon atoms for use in the invention include, for example, ethylene, propylene, isobutene and 1-butene. Of those, preferred is ethylene. The content of the α-olefin units in PVA falls between 0.5 and 24 mol %, but preferably between 0.8 and 15 mol %, more preferably between 1 and 8 mol %. PVA in which the content of the α-olefin units is smaller than 0.5 mol % could hardly exhibit the effect of modification with such an α-olefin. However, PVA in which the content of the α-olefin units is larger is more hydrophobic and its solubility in water is lower, and if so, PVA itself will be poorly soluble in water and will lose its own characteristics intrinsic thereto. This tendency is more remarkable in PVA in which the content of α-olefins is larger than 24 mol %.

Not detracting from the advantages of the invention, PVA for use herein may be copolymerized with any other copolymerizable ethylenic unsaturated monomer. The ethylenic unsaturated monomer includes, for example, acrylic acid, methacrylic acid, phthalic acid (anhydride), maleic acid (anhydride), itaconic acid (anhydride), acrylonitrile, methacrylonitrile, acrylamido-2-methylpropanesulfonic acid and its sodium salt, sodium vinylsulfonate, sodium allylsulfonate, ethyl vinyl ether, butyl vinyl ether, vinyl chloride, vinyl bromide, vinyl fluoride, vinylidene chloride, vinylidene fluoride, and tetrafluoroethylene. The content of the ethylenic unsaturated monomer units in the vinyl alcohol polymer is preferably less than 10 mol %, more preferably less than 5 mol %, even more preferably less than 2 mol %.

PVA may be modified at its ends with a chain transfer agent while it is prepared, or may be post-modified. Also if desired, polyvinyl acetate to give PVA may also be modified in any desired manner.

The degree of polymerization of PVA for use in the invention is preferably at least 20 mPa·s in terms of the viscosity of an aqueous 4 wt. % solution of the polymer, in view of the strength, the stretchability, the polarizing properties and the durability of the polymer film. The viscosity of the aqueous polymer solution defined herein is measured with a Brookfield viscometer while the solution is rotated at 60 rpm with a rotor No. 1 at 20° C.

Also preferably, the degree of polymerization of PVA does not exceed 1000 mPa·s in terms of the viscosity of the aqueous 4 wt. % solution of the polymer. If the viscosity of the aqueous 4 wt. % solution thereof exceeds 1000 mPa·s, PVA will be difficult to produce. The B-type viscometer rotor to be used in measuring the viscosity of aqueous PVA solutions of high viscosity may be selected from Nos. 1 to 3 in accordance with the high viscosity of the solutions. More preferably, the degree of polymerization of PVA falls between 22 and 500 mPa·s, even more preferably between 25 and 250 mPa·s in terms of the viscosity of an aqueous 4 wt. % solution of the polymer.

The mean degree of hydrolysis of the vinyl ester moiety of PVA for use in the invention is preferably at least 90 mol %, more preferably at least 96 mol %, most preferably at least 98 mol % in view of the durability of the polarizing film to be produced from PVA.

PVA may be formed into its film, for example, as follows: PVA is dissolved in water, an organic solvent or a mixed solvent of water and an organic solvent to prepare a PVA solution, and this is formed into a PVA film in a casting method, a wet filming method (that comprises jetting the PVA solution into a bad solvent), a gel filming method (that comprises once gelling the PVA solution by cooling it, followed by removing the solvent from the gel through extraction to give a PVA film), or a combination of any of these. Also employable is a melt extrusion method of melting hydrous PVA (this may contain an organic solvent and the like) and extruding the resulting PVA melt. Of those, preferred are the casting method and the melt extrusion method to give the intended PVA film, as the PVA film thus produced gives a good polarizing film.

The solvent to be used for dissolving PVA therein in producing a PVA film includes, for example, dimethylsulfoxide, dimethylformamide, dimethylacetamide, N-methylpyrrolidone, ethylene glycol, propylene glycol, diethylene glycol, triethylene glycol, tetraethylene glycol, trimethylolpropane, ethylenediamine, diethylenetriamine, glycerin, and water. One or more of these may be used herein. Of those, preferred is dimethylsulfoxide, water, or a mixed solvent of glycerin and water.

The PVA concentration of the PVA solution or hydrous PVA to be used in producing the PVA film preferably falls between 10 and 70% by weight, more preferably between 13 and 55% by weight, most preferably between 15 and 50% by weight. If desired, the PVA solution or hydrous PVA may contain any of plasticizer, surfactant and dichroic dye.

The plasticizer that may be in the PVA solution or hydrous PVA to be used in producing the PVA film is preferably a polyhydric alcohol. Its examples are ethylene glycol, glycerin, propylene glycol, diethylene glycol, diglycerin, triethylene glycol, tetraethylene glycol, and trimethylolpropane. One or more of these polyhydric alcohols may be used herein either singly or as combined. Of those polyhydric alcohols, preferred is diglycerin, ethylene glycol or glycerin in view of its effect of improving the stretchability of the PVA film formed.

The amount of the polyhydric alcohol to be added to the PVA solution or hydrous PVA preferably falls between 1 and 30 parts by weight, more preferably between 3 and 25 parts by weight, most preferably between 5 and 20 parts by weight relative to 100 parts by weight of PVA. If it is smaller than 1 part by weight, the colorability and the stretchability of the PVA film formed will be not good; but if larger than 30 parts by weight, the PVA film formed will be too flexible and its handlability will be not good.

The type of the surfactant that may be in the PVA solution or hydrous PVA to give the PVA film is not specifically defined, but is preferably a nonionic surfactant. Preferred examples of the nonionic surfactant are alkyl ether-type nonionic surfactants such as polyoxyethylene oleyl ether; alkylphenyl ether-type ones such as polyoxyethylene octylphenyl ether; alkyl ester-type ones such as polyoxyethylene laurate; alkylamine-type ones such as polyoxyethylene laurylaminoether; alkylamide-type ones such as polyoxyethylene laurylamide; polypropylene glycol ether-type ones such as polyoxyethylene-polyoxypropylene ether; alkanolamide-type ones such as oleyldiethanolamide; and allylphenyl ether-type ones such as polyoxyalkylene allylphenyl ether. One or more of these surfactants may be used herein either singly or as combined.

The amount of the surfactant that may be added to the PVA solution or hydrous PVA preferably falls between 0.01 and 1 part by weight, more preferably between 0.02 and 0.5 parts by weight, most preferably between 0.05 and 0.3 parts by weight relative to 100 parts by weight of PVA. If its amount is smaller than 0.01 parts by weight, the surfactant will be ineffective for improving the stretchability and the colorability of the PVA film; but if larger than 1 part by weight, the surfactant will dissolve out of the surface of the PVA film to cause surface blocking of the film, and if so, the handlability of the film is not good.

For the dichroic dye that may be in the PVA solution or hydrous PVA to give the PVA film, referred to are those mentioned hereinunder for coloring the PVA film therewith.

Preferably, the thickness of the PVA film falls between 5 and 150 μm, more preferably between 20 and 100 μm, even more preferably between 30 and 90 μm, most preferably between 35 and 80 μm.

For fabricating polarizing films from the PVA film, for example, the PVA film is colored, monoaxially stretched, set as it is, and dried, and optionally subjected to thermal treatment. In the process, the order of the steps of coloring, monoaxially stretching and setting the film is not specifically defined. If desired, the film may be monoaxially stretched twice or more.

The PVA film of the invention is suitable to coloration with dichroic dye. In particular, even when the PVA film of the invention is colored with dichroic dye, its water resistance and polarizing properties are still good. Another advantage of the PVA film is that it can be uniformly colored with dichroic dye to give polarizing films free from a problem of irregular coloration.

For coloring PVA films with dichroic dye, one popular method generally employed in the art comprises dipping PVA films in a solution that contains dichroic dye. In the present invention, however, dichroic dye may be added to the PVA solution or hydrous PVA to give PVA films, as so mentioned hereinabove, and the condition and the method for the dye addition thereto are not specifically defined.

In the invention, in case where the PVA film is dipped in a solution that contains dichroic dye, the treatment may be effected in any stage before, during or after the film is monoaxially stretched. Examples of the dichroic dye employable herein are Direct Black 17, 19, 154; Direct Brown 44, 106, 195, 210, 223; Direct Red 2, 23, 28, 31, 37, 39, 79, 81, 240, 242, 247; Direct Blue 1, 15, 22, 78, 90, 98, 151, 168, 202, 236, 249, 270; Direct Violet 9, 12, 51, 98; Direct Green 1, 85; Direct Yellow 8, 12, 44, 86, 87; and Direct Orange 26, 39, 106, 107. Even when one dichroic dye is used alone for coloring the PVA films, it surely gives color polarizing films, but combining two or more dichroic dyes for coloring it is preferred because of its advantages that the polarizing films thus fabricated in that manner may have the same absorption characteristics in the overall wavelength range of visible light of from 380 to 780 nm and have a high degree of polarization. The dichroic dye referred to herein is meant to include organic dyes but not inorganic dyes such as iodine.

The PVA film of the invention may be colored with not only such dichroic dye but also with iodine-potassium iodide or the like.

For monoaxially stretching the PVA film, for example, employable is a wet stretching method of stretching it in a hot bath (this may be a dye-containing solution such as that mentioned above, or a setting bath to be mentioned hereinunder), or a dry heat stretching method of stretching the wet PVA film in air. The stretching temperature is not specifically defined. In case where the PVA film is stretched in a hot bath (in the wet stretching method), the temperature preferably falls between 30 and 90° C.; but in case where it is stretched in the dry heat stretching method, the temperature preferably falls between 50 and 180° C. The monoaxially-stretching draw ratio (in multi-stage monoaxial stretching, it is the overall draw ratio in all the stretching stages) is preferably at least 400%, more preferably at least 500% in length of the non-stretched original film in view of the polarizing properties of the polarizing films to be produced from the thus-stretched film. The uppermost limit of the draw ratio is not specifically defined, but is preferably at most 800% for uniformly stretching the film. After thus stretched, the thickness of the film preferably falls between 3 and 75 μm, more preferably between 5 and 50 μm.

Optionally, the PVA film thus having received dichroic dye and having been monoaxially stretched may be set in any known method, for example, by dipping it in a water bath that contains boric acid and/or a boron compound. This treatment increases the light transmittance, the degree of polarization and the durability of the resulting film. Further optionally, the thus-set PVA film may be fixed in a water bath that contains a cationic polymer compound.

The monoaxially-stretched film is dried (for thermal treatment) preferably at a temperature falling between 30 and 150° C., more preferably between 50 and 150° C.

The polarizing film thus obtained in the manner as above may be fabricated into a polarizer by sticking an optically-transparent protective film of good mechanical strength to one or both surfaces thereof. The material to form the protective film may be any and every one generally used in the art for that purpose, including, for example, cellulose acetate films, acrylic films, polyester films, polyolefin films, and polyamide films.

EXAMPLES

The following Examples illustrate the present invention specifically, but not limit the scope of the present invention.

Unless otherwise specifically indicated, % and parts in the Examples are all by weight. The dichroic ratio of the products fabricated in the Examples is measured according to the method mentioned below.

Dichroic Ratio:

Dichroic ratio is one index of the polarizing properties of polarizing films. This is measured according to the Standard of EIAJ (the Electronic Industry Association of Japan) LD-201-1983. Concretely, using a spectrophotometer with a C light source, each sample is measured in a visual field of 2 degrees to obtain its transmittance Ts (%) and polarization degree P (%), and its dichroic ratio is computed according to the following equation:

$$\text{Dichroic Ratio} = \log(Ts/100 - (Ts/100) \times P/100) / \log(Ts/100 + (Ts/100) \times P/100)$$

Example 1

To PVA that contains 0.3 mol % of cationic group-containing units (3-methacrylamido propyl trimethylammonium chloride units) and 2.5 mol % of ethylene units and has a degree of hydrolysis at its vinyl acetate moiety of 99.2 mol % and a Brookfield viscosity (measured as its aqueous 4% solution at 20° C. with a rotor No. 1) of 38 mPa·s, added were 12% of glycerin and water in a hot bath to prepare an aqueous PVA solution having a water content of 85%. The resulting aqueous PVA solution was jetted through a slit out onto a roll having a surface temperature of 70° C., then dried and heated thereon to obtain a PVA film having a thickness of 75 μm. To confirm the degree of swellability thereof, the PVA film was swollen in distilled water at 30° C. for 10 minutes with stirring therein. The degree of swellability of the film was 180%.

The PVA film was monoaxially stretched, colored, set and dried in that order to be a polarizing film. Concretely, the PVA film was dipped in an aqueous 4% boric acid solution (bath temperature, 55° C.), and then stretched 6-fold in the monoaxial direction thereof. While kept stretched, this was dipped for 1 minute in an aqueous 0.65% dichroic dye (Direct Sky Blue 6B) solution (bath temperature, 40° C.) to thereby make it receive the dye, then processed in an aqueous 4% boric acid solution (bath temperature, 35° C.) for 4 minutes, and then dried in hot air at 50° C. This gave a polarizing film having a thickness of 30 μm.

Both surfaces of the thus-obtained polarizing film were laminated with a surface-hydrolyzed triacetyl cellulose film, using an aqueous solution of PVA117H (of Kuraray). This gave a polarizer.

Measured at its maximum absorption wavelength, the polarizer had a transmittance of 42.3%, a degree of polarization of 99.7% and a dichroic ratio of 39.5. Two and the same polarizer plates fabricated under the same condition were combined in cross-Nicol, and visually checked for irregular coloration. No irregular coloration was seen in the combined polarizer plates.

Example 2

A polarizing film and a polarizer were fabricated in the same manner as in Example 1 except the following changes: PVA that contains 2.0 mol % of cationic group-containing units (3-methacrylamido propyl trimethylammonium chloride units) and 4.5 mol % of ethylene units and has a degree of hydrolysis at its vinyl acetate moiety of 98.7 mol % and a Brookfield viscosity (measured as its aqueous 4% solution at 20° C. with a rotor No. 1) of 25 mPa·s was formed into a PVA film having a thickness of 75 μm. The concentration of the aqueous dichroic dye (Direct Sky Blue 6B) solution was 0.5 %. The thickness of the polarizing film obtained was 30 μm.

The degree of swellability of the PVA film (measured by swelling the PVA film in distilled water at 30° C. for 10 minutes with stirring therein) to be the polarizing film was 177%.

Measured at its maximum absorption wavelength, the polarizer had a transmittance of 42.0%, a degree of polarization of 99.7% and a dichroic ratio of 38.0. Two and the same polarizer plates fabricated under the same condition were combined in cross-Nicol, and visually checked for irregular coloration. No irregular coloration was seen in the combined polarizer plates.

Example 3

The same PVA film as in Example 2 was monoaxially stretched, colored, set and dried in that order to be a polarizing film. Concretely, the PVA film was stretched 6-fold in dry air at 75° C. in the monoaxial direction thereof. While kept stretched, this was dipped for 1 minute in an aqueous 0.5% dichroic dye (Direct Sky Blue 6B) solution (bath temperature, 40° C.) to thereby make it receive the dye, then processed in an aqueous 4% boric acid solution (bath temperature, 35° C.) for 4 minutes, and then dried in hot air at 50° C. This gave a polarizing film having a thickness of 30 μm. With that, both surfaces of the thus-obtained polarizing film were laminated with a surface-hydrolyzed triacetyl cellulose film, using an aqueous solution of PVA117H (of Kuraray). This gave a polarizer.

Measured at its maximum absorption wavelength, the polarizer had a transmittance of 41.9%, a degree of polarization of 99.5% and a dichroic ratio of 34.4. Two and the same polarizer plates fabricated under the same condition were combined in cross-Nicol, and visually checked for irregular coloration. No irregular coloration was seen in the combined polarizer plates.

Example 4

A polarizing film and a polarizer were fabricated in the same manner as in Example 2 except the following changes: PVA that contains 2.0 mol % of cationic group-containing units (3-methacrylamido propyl trimethylammonium chloride units) and 5.2 mol % of ethylene units and has a degree of hydrolysis at its vinyl acetate moiety of 98.9 mol % and a Brookfield viscosity (measured as its aqueous 4% solution at 20° C. with a rotor No. 1) of 17 mPa·s was formed into a PVA film having a thickness of 75 μm. The thickness of the polarizing film obtained was 30 μm.

The degree of swellability of the PVA film (measured by swelling the PVA film in distilled water at 30° C. for 10 minutes with stirring therein) to be the polarizing film was 185%.

Measured at its maximum absorption wavelength, the polarizer had a transmittance of 42.5%, a degree of polarization of 98.1% and a dichroic ratio of 28.0. Two and the same polarizer plates fabricated under the same condition were combined in cross-Nicol, and visually checked for irregular coloration. No irregular coloration was seen in the combined polarizer plates.

Example 5

A polarizing film and a polarizer were fabricated in the same manner as in Example 2 except the following changes: PVA that contains 2.0 mol % of cationic group-containing units (3-acrylamido propyl trimethylammonium chloride units) and 4.7 mol % of ethylene units and has a degree of hydrolysis at its vinyl acetate moiety of 98.6 mol % and a Brookfield viscosity (measured as its aqueous 4% solution at 20° C. with a rotor No. 1) of 26 mPa·s was formed into a PVA film having a thickness of 75 μm. The thickness of the polarizing film obtained was 30 μm.

The degree of swellability of the PVA film (measured by swelling the PVA film in distilled water at 30° C. for 10 minutes with stirring therein) to be the polarizing film was 185%.

Measured at its maximum absorption wavelength, the polarizer had a transmittance of 42.1%, a degree of polarization of 99.7% and a dichroic ratio of 38.5. Two and the same polarizer plates fabricated under the same condition were combined in cross-Nicol, and visually checked for irregular coloration. No irregular coloration was seen in the combined polarizer plates.

Comparative Example 1

A polarizing film and a polarizer were fabricated in the same manner as in Example 1 except the following changes: PVA-HC (of Kuraray—this is a non-modified PVA, and has a degree of hydrolysis at its vinyl acetate moiety of 99.9 mol % and a Brookfield viscosity, measured as its aqueous 4% solution at 20° C. with a rotor No. 1, of 25 mPa·s) was formed into a PVA film having a thickness of 75 μm. The concentration of the aqueous dichroic dye (Direct Sky Blue 6B) solution was 1.0%. The thickness of the polarizing film obtained was 30 μm.

The degree of swellability of the PVA film (measured by swelling the PVA film in distilled water at 30° C. for 10 minutes with stirring therein) to be the polarizing film was 190%.

Measured at its maximum absorption wavelength, the polarizer had a transmittance of 42.3%, a degree of polarization of 97.4% and a dichroic ratio of 25.0. Two and the same polarizer plates fabricated under the same condition were combined in cross-Nicol, and visually checked for irregular coloration. Some irregular coloration was seen in the combined polarizer plates.

Comparative Example 2

A polarizing film and a polarizer were fabricated in the same manner as in Example 2 except the following changes: PVA that contains 0.2 mol % of cationic group-containing units (3-acrylamido propyl trimethylammonium chloride units) and has a degree of hydrolysis at its vinyl acetate moiety of 99.6 mol % and a Brookfield viscosity (measured as its aqueous 4% solution at 20° C. with a rotor No. 1) of 27 mPa·s was formed into a PVA film having a thickness of 75 μm. The thickness of the polarizing film obtained was 30 μm.

The degree of swellability of the PVA film (measured by swelling the PVA film in distilled water at 30° C. for 10 minutes with stirring therein) to be the polarizing film was 178%.

Measured at its maximum absorption wavelength, the polarizer had a transmittance of 42.0%, a degree of polarization of 98.3% and a dichroic ratio of 27.0. Two and the same polarizer plates fabricated under the same condition were combined in cross-Nicol, and visually checked for irregular coloration. No irregular coloration was seen in the combined polarizer plates.

Comparative Example 3

A polarizing film and a polarizer were fabricated in the same manner as in Example 1 except the following changes: PVA that contains 4.7 mol % of ethylene units and has a degree of hydrolysis at its vinyl acetate moiety of 99.8 mol % and a Brookfield viscosity (measured as its aqueous 4% solution at 20° C. with a rotor No. 1) of 30.5 mPa·s was formed into a PVA film having a thickness of 75 μm. The concentration of the aqueous dichroic dye (Direct Sky Blue 6B) solution was 1.0%. The thickness of the polarizing film obtained was 30 μm.

The degree of swellability of the PVA film (measured by swelling the PVA film in distilled water at 30° C. for 10 minutes with stirring therein) to be the polarizing film was 206%.

Measured at its maximum absorption wavelength, the polarizer had a transmittance of 42.5%, a degree of polarization of 97.8% and a dichroic ratio of 26.9. Two and the same polarizer plates fabricated under the same condition were combined in cross-Nicol, and visually checked for irregular coloration. Some irregular coloration was seen in the combined polarizer plates.

Comparative Example 4

A polarizing film and a polarizer were fabricated in the same manner as in Example 1 except for the following changes: PVA that contains 0.5 mol % of cationic group-containing units (3-methacrylamido propyl trimethylammonium chloride units) and 32 mol % of ethylene units and has a degree of hydrolysis at its acetate moiety of 98.5 mol % was formed into a PVA film having a thickness of 75 μm. The concentration of the aqueous dichroic dye (Direct Sky Blue 6B) solution was 2.0%. The thickness of the polarizing film obtained was 30 μm.

Since the PVA used herein did not dissolve in water to give an aqueous 4% solution thereof, its viscosity was impossible to measure. The degree of swellability of the PVA film (measured by swelling the PVA film in distilled water at 30° C. for 10 minutes with stirring therein) to be the polarizing film was 115%.

Both the polarizing film and the polarizer obtained herein were difficult to color, and their colorability was too bad to evaluate them.

Example 6

A polarizing film and a polarizer were fabricated in the same manner as in Example 1 except the following changes: PVA that contains 1.0 mol % of cationic group-containing units (3-methacrylamido propyl trimethylammonium chloride units) and 2.5 mol % of ethylene units and has a degree of hydrolysis at its vinyl acetate moiety of 99.0 mol % and a Brookfield viscosity (measured as its aqueous 4% solution at 20° C. with a rotor No. 1) of 27 mPa·s was formed into a PVA film having a thickness of 75 μm. The thickness of the polarizing film obtained was 30 μm.

The degree of swellability of the PVA film (measured by swelling the PVA film in distilled water at 30° C. for 10 minutes with stirring therein) to be the polarizing film was 180%.

Measured at its maximum absorption wavelength, the polarizer had a transmittance of 41.9%, a degree of polarization of 99.9% and a dichroic ratio of 43.9. Two and the same polarizer plates fabricated under the same condition were combined in cross-Nicol, and visually checked for irregular coloration. No irregular coloration was seen in the combined polarizer plates.

Example 7

A polarizing film and a polarizer were fabricated in the same manner as in Example 1 except the following changes: PVA that contains 1.0 mol % of cationic group-containing units (3-methacrylamido propyl trimethylammonium chloride units) and 4.7 mol % of ethylene units and has a degree of hydrolysis at its vinyl acetate moiety of 98.8 mol % and a Brookfield viscosity (measured as its aqueous 4% solution at 20° C. with a rotor No. 1) of 26 mPa·s was formed into a PVA film having a thickness of 75 μm. The thickness of the polarizing film obtained was 30 μm.

The degree of swellability of the PVA film (measured by swelling the PVA film in distilled water at 30° C. for 10 minutes with stirring therein) to be the polarizing film was 177%.

Measured at its maximum absorption wavelength, the polarizer had a transmittance of 42.5%, a degree of polarization of 99.2% and a dichroic ratio of 34.1. Two and the same polarizer plates fabricated under the same condition were combined in cross-Nicol, and visually checked for irregular coloration. No irregular coloration was seen in the combined polarizer plates.

Comparative Example 5

PVA that contains 2.0 mol % of cationic group-containing units (3-acrylamido propyl trimethylammonium chloride units) and has a degree of hydrolysis at its vinyl acetate moiety of 98.7 mol % and a Brookfield viscosity (measured as its aqueous 4% solution at 20° C. with a rotor No. 1) of 28 mPa·s was formed into a PVA film having a thickness of 75 µm. Measuring the degree of swellability of the film was tried but in vain, since the film partly dissolved in water. As having dissolved in the processing bath used, the PVA film could not be formed into a polarizing film.

Comparative Example 6

A polarizing film and a polarizer were fabricated in the same manner as in Example 1 except the following changes: PVA that contains 4.7 mol % of ethylene units and has a degree of hydrolysis at its vinyl acetate moiety of 98.6 mol % and a Brookfield viscosity (measured as its aqueous 4% solution at 20° C. with a rotor No. 1) of 29 mPa·s was formed into a PVA film having a thickness of 75 µm. The concentration of the aqueous dichroic dye (Direct Sky Blue 6B) solution was 1.0%. The thickness of the polarizing film obtained was 30 µm.

Measured at its maximum absorption wavelength, the polarizer had a transmittance of 42.1%, a degree of polarization of 98.4% and a dichroic ratio of 27.8. Two and the same polarizer plates fabricated under the same condition were combined in cross-Nicol, and visually checked for irregular coloration. Some irregular coloration was seen in the combined polarizer plates.

The polyvinyl alcohol film of the invention gives polarizing films and polarizer which are resistant to water and have good polarizing properties and which are free from a problem of irregular coloration, and its usefulness is great.

Although the invention has been fully described in connection with the preferred embodiments thereof, those skilled in the art will readily conceive of numerous changes and modifications within the framework of obviousness upon the reading of the specification herein presented of the invention. Accordingly, such changes and modifications are, unless they depart from the scope of the present invention as delivered from the claims annexed thereto, to be construed as included therein.

What is claimed is:

1. A polyvinyl alcohol film of a vinyl alcohol polymer that contains from 0.01 to 20 mol % of cationic group-containing units, from 0.5 to 24 mol % of α-olefin units having at most 4 carbon atoms and from 1 to 30 parts by weight, based on 100 parts by weight of the vinyl alcohol polymer, of a polyhydric alcohol, and wherein the thickness of the polyvinyl alcohol film ranges from 20 to 100 µm.

2. The polyvinyl alcohol film as claimed in claim 1, wherein the α-olefin is ethylene.

3. The polyvinyl alcohol film as claimed in claim 1, wherein the vinyl alcohol polymer has a viscosity of at least 20 mPa·s in an aqueous 4 wt % solution at 20° C.

4. The polyvinyl alcohol film as claimed in claim 1, wherein the vinyl ester moiety of the polyvinyl alcohol polymer has a mean degree of hydrolysis of at least 90 mol %.

5. The polyvinyl alcohol film as claimed in claim 1, wherein the polyvinyl alcohol polymer is obtained by hydrolyzing a copolymer of a vinyl ester, a cationic group-containing monomer and an α-olefin having at most 4 carbon atoms.

6. The polyvinyl alcohol film as claimed in claim 1, wherein the polyvinyl alcohol film contains a polyhydric alcohol plasticizer.

7. The polyvinyl alcohol film as claimed in claim 1, wherein the polyvinyl alcohol film contains a nonionic surfactant.

8. The polyvinyl alcohol film as claimed in claim 7, wherein the surfactant is present in an amount ranging from 0.01 to 1 parts by weight, based on 100 parts by weight of polyvinyl alcohol polymer.

9. The polyvinyl alcohol film as claimed in claim 1, wherein the cationic group-containing units are derived from a monomer selected from the group consisting of trimethyl-(3-acrylamido-3-dimethylpropyl)ammonium chloride, 3-acrylamidopropyltrimethylammonium chloride, 3-methacrylamidopropyltrimethylammonium chloride, quaternary ammonium salts of N-(3-allyloxy-2-hydroxypropyl)dimethylamine, quaternary ammonium salts of N-(4-allyloxy-3-hydroxybutyl)diethylamine and quaternary ammonium salts of acrylamide, N-methylacrylamide, N-ethylacrylamide, N,N-dimethylacrylamide, diacetoneacrylamide, N-methylolacrylamide, methacrylamide, N-methylmethacrylamide, N-ethylmethacrylamide and N-methylolmethacrylamide.

10. The polyvinyl alcohol film as claimed in claim 1, wherein the content of cationic group-containing units in the polymer ranges from 0.05 to 10 mol % and the content of α-olefin units having at most 4 carbon atoms ranges from 0.8 to 15 mol %.

11. The polyvinyl alcohol film as claimed in claim 10, wherein the content of cationic group-containing units in the polymer ranges from 0.1 to 5 mol % and the content of α-olefin units having at most 4 carbon atoms ranges from 1 to 8 mol %.

12. The polyvinyl alcohol film as claimed in claim 1, wherein the unit content of the vinyl alcohol polymer is comprised of units of a copolymerizable unsaturated monomer selected from the group consisting of acrylic acid, methacrylic acid, phthalic acid (anhydride), maleic acid (anhydride), itaconic acid (anhydride), acrylonitrile, methacrylonitrile, acrylamido-2-methylpropanesulfonic acid and its sodium salt, sodium vinylsulfonate, sodium allylsulfonate, ethyl vinyl ether, butyl vinyl ether, vinyl chloride, vinyl bromide, vinyl fluoride, vinylidene chloride, vinylidene fluoride and tetrafluoroethylene in an amount of less than 10 mol %.

13. The polyvinyl alcohol film as claimed in claim 12, wherein the unit content of the copolymerizable unsaturated monomer is less than 5 mol %.

* * * * *